Patented Feb. 17, 1931

1,793,310

UNITED STATES PATENT OFFICE

CARLETON ELLIS, OF MONTCLAIR, NEW JERSEY, ASSIGNOR TO ELLIS-FOSTER COMPANY, A CORPORATION OF NEW JERSEY

SYNTHETIC RESIN

No Drawing.    Application filed March 23, 1923.    Serial No. 627,086.

This invention relates to a resinous product and to the process of making same prepared by reacting on phenol or homologues with benzotrichloride.

When toluol which has been heavily chlorinated in the side chain is mixed with an equal weight of phenol and warmed, reaction takes place and a dark red very viscous product results. On heating this on a hot plate an infusible dark resinous body is obtained. During the reaction between phenol and the chlorinated toluol hydrochloric acid is evolved. In the presence of anhydrous aluminum chloride reaction proceeds much more vigorously, it starts in the cold and progresses with the evolution of heat. The resinous product obtained hardens more rapidly to an infusible product in the presence of aluminum chloride. Without the latter a period of three and a half hours was required in one case to obtain an infusible product while in the presence of aluminum chloride heating for only twenty minutes sufficed.

In the following experiments absolutely pure benzotrichloride was not used but instead a product obtained by chlorinating toluol under conditions to effect side chain chlorination in the main. The chlorination was carried to the point where a predominating amount of benzotrichloride was obtained or the latter material in a crude state was obtained by rectification of the chlorinated toluol. Thus varying amounts of benzyl and benzal chloride and also products containing chlorine in the ring were used, benzotrichloride in each case being the main reacting constituent. In one case 25 c. c. of molten phenol were treated with 25 c. c. of crude benzotrichloride diluted with 25 c. c. of alcohol. The mixture was heated to boiling for 15 minutes in a flask connected with a reflux condenser. A dark red solution was obtained. 150 grams of asbestos flour were impregnated with this solution and the mixture was heated to remove the solvent and also to drive off sufficient volatile matter so that the resinous material would have sufficient body to be employed in making molded articles. If the resinous substance is too thinly fluid it will be squeezed out of the filler, passing around the plunger of the mold thus escaping during pressing. While the material is being heated it passes through several changes of color, first turning yellow, and on further heating white fumes are given off and the material becomes brick red. When the mass acquires a dark brick red color it is satisfactory for molding. Previous to this it was observed that if the mixture were molded, the binder would be forced out of the mold. After molding in the cold, to form shaped articles, these were baked which caused the composition to harden. Baking may be carried out in an oven or on a hot plate. Discs molded from the above resin and asbestos composition did not blister during the baking operation.

In another case phenol, benzotrichloride and asbestos flour were heated together in order to form the resinous material in contact with the filler. In this case discs likewise were made by molding in the cold then removing from the mold and baking on a hot plate. These discs were somewhat stronger than in the last previous example.

A product obtained by using 3 mols. of phenol to approximately 1 mol. of benzotrichloride afforded an intermediate resinous compound which when heated with about one-fourth of its weight of ordinary 40 per cent formaldehyde under a reflux condenser for 3 hours yielded two layers. This amount of formaldehyde solution would be 10% actual $CH_2O$ (based on the intermediate). The upper of said two layers was aqueous and the lower was a solid somewhat rubbery dark material. After washing with water this product was dissolved in alcohol and the solution used to impregnate asbestos flour. To one part of this type of resin, three parts by weight of asbestos flour was used. The composition was dried until it was capable of being molded in the cold. The composition was found to shape readily by cold pressing to form shaped articles (e. g. discs) of good appearance. These were removed from the mold and baked at a temperature ranging up to about 300° C. These discs were somewhat stronger than in the last paragraph above.

In another case 10 per cent of hexamethylene-tetramine was added to the resin (produced by reacting phenol and benzotrichlorid and reacting on the product with formaldehyde, all as described in the last paragraph) and the mixture in alcohol was incorporated with three times its weight of powdered asbestos. This was dried to the point at which the powder was found to cohere readily under pressure and then articles were stamped out of the mixture by pressing in the cold. These shaped articles were removed from the mold, placed on a hot plate for 10 minutes thereby causing hardening.

In another case the last mentioned composition was subjected to hot pressing at a pressure per square inch ranging from 1000 to 2000 pounds and a temperature of 150–170° C. approximately.

Other fillers than asbestos fibre or asbestos flour may be used such as the various mineral fillers commonly employed in the plastic arts.

While I have mentioned aluminum chloride as a catalyst I may also use other substances for like purpose such as ferric chloride, or I may dispense with catalyzers entirely. The chlorides of iron and of aluminum are hereinafter embraced in the expression "a chloride of the iron-aluminum group". Iron and aluminum are similar in that their chlorides are suitable as catalysts for this reaction. In place of benzotrichloride I may also employ the chlorine compounds of other methyl benzols which are capable of being chlorinated in the side chain, or of other aromatic hydrocarbons having side chains which chlorinate to form reactive compounds of like character.

The reaction may be carried out with higher phenols or a mixture of ordinary phenol and higher phenols including ortho, meta and para cresols, tar acids and other appropriate phenolic bodies.

What I claim is:

1. The process of making a resinous composition which comprises reacting on a phenol with benzotrichloride in the presence of a chloride of a metal selected from the herein described group consisting of iron and aluminum.

2. The process of making a resinuous composition which comprises reacting with toluol, chlorinated in the side chain and containing benzotrichloride as its predominating constituent together with small amount of other chlorinated compounds of toluol, upon a phenol in the presence of a chloride of a metal selected from the herein described group consisting of iron and aluminum, to produce a resinous substance.

3. A resinous composition comprising the infusible reaction product of a phenol and benzotrichloride.

4. A process which comprises heating a material containing a soluble benzotrichloride-phenol resin, to a temperature sufficient to render the same infusible.

5. The process of making a resinous composition which comprises reacting three mols. of phenol with one mol. of benzotrichloride in the presence of alcohol as a solvent.

6. The process of making a resinous composition which comprises reacting on a phenol with benzotrichloride, dissolved in alcohol, in the presence of a catalyst.

7. The process of making a resinous composition which comprises reacting three mols. of phenol with one mol. of benzotrichloride and thereafter reacting upon the resulting resinous material with formaldehyde.

8. The process of making a resinous composition which comprises reacting a phenol with chlorinated toluol containing benzo-trichloride and thereafter reacting upon the resulting resinous material with formaldehyde.

9. The process of making a resinous composition which comprises reacting on a phenol with chlorinated toluol containing benzotrichloride and other chlorinated bodies and thereafter upon the resulting resinous material with formaldehyde.

10. The process of making a resinous composition which comprises reacting on a phenol with benzotrichloride in the presence of a catalyst selected from the herein described group consisting of the chlorides of iron and aluminum, and thereafter reacting upon the resulting resinous material with formaldehyde.

11. The process of making a resinous composition which comprises reacting with toluol, chlorinated in the side chain and containing benzotrichloride, upon a phenol in the presence of a chloride of a metal selected from the herein described class consisting of the metals, iron and aluminum, to produce a resinous substance, and thereafter reacting upon the resulting resinous material with formaldehyde.

12. The process of making a resinous composition which comprises reacting three mols. of phenol with one mol. of benzotrichloride and thereafter reacting upon the resulting resinous material with about 10% of actual formaldehyde.

13. The process of making a resinous composition which comprises reacting with toluol, chlorinated in the side chain and containing benzotrichloride, upon a phenol in the presence of a chloride of a metal selected from the herein described class consisting of the metals iron and aluminum, to produce a resinous substance, and thereafter reacting upon the resulting resinous material with about 10% of actual formaldehyde.

CARLETON ELLIS.